US008812410B2

(12) United States Patent
Haber et al.

(10) Patent No.: US 8,812,410 B2
(45) Date of Patent: Aug. 19, 2014

(54) EFFICIENT DATA PROFILING TO OPTIMIZE SYSTEM PERFORMANCE

(75) Inventors: Gad Haber, Nesher (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/217,269

(22) Filed: Aug. 25, 2011

(65) Prior Publication Data

US 2013/0054494 A1 Feb. 28, 2013

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 7,165,242 B2 | 1/2007 | Dmitriev | |
| 2006/0161648 A1* | 7/2006 | Ding et al. | 709/224 |
| 2009/0234944 A1* | 9/2009 | Sylor et al. | 709/224 |
| 2010/0146220 A1 | 6/2010 | Panchenko et al. | |
| 2011/0273476 A1* | 11/2011 | Tang et al. | 345/660 |

OTHER PUBLICATIONS

Britton, http://web.archive.org/web/20080519072535/http://mathcentral.uregina.ca/QQ/database/QQ.09.02/carlos1.html, May 19, 2008, pp. 2.*
Chi-Keung Luk et al., "Profile-Guided Post-Link Stride Prefetching", Proceedings of the 16th international conference on Supercomputing, 2002; Publisher: ACM.
Brad Calder et al., "Value Pro ling and Optimization", In Proceedings of the 30th Annual IEEE/ACM International Symposium on Microarchitecture (MICRO-97), pp. 259{269, Los Alamitos, Dec. 1{3 1997. IEEE Computer Society.
Robert Muth et al., "Code Specialization Based on Value Profiles", J. Palsberg (Ed.): SAS 2000, LNCS 1824, pp. 340-361, 2000. Springer-Verlag Berlin Heidelberg.
Tal Shaked, "Value Specialization using PLTO", May 1, 2002. URL: http://webcache.googleusercontent.com/search?q=cache:vW3XPBpu8yoJ:www.cs.arizona.edu/solar/papers/tal.thesis.ps+function+specialization+%22common+values%22&cd=4&hl=en&ct=clnk (Last Printed on Apr. 14, 2011).
Shaomei Wu et al., "Phoenix Feedback-Directed Static Compiler Optimization".

* cited by examiner

*Primary Examiner* — Li-Wu Chang (57) ABSTRACT

Systems and methods for data profiling are provided. In one embodiment, the method comprises monitoring value of at least a target parameter during execution of logic code in a computing environment, wherein the value of the target parameter is incrementally updated in a sequence of data points; and using statistical analysis to determine a target value for the target parameter as of a current data point, in response to determining a change in the value of the target parameter at each data point.

17 Claims, 5 Drawing Sheets

| $X_1$ | $X_2$ | $X_3$ | $X_4$ | $X_5$ | $X_6$ | $X_7$ | $X_8$ | $X_9$ | $X_{10}$ |
|---|---|---|---|---|---|---|---|---|---|
| 7 | 5 | 5 | 6 | 5 | 5 | 6 | 5 | 5 | 5 |

Sequence 300 (Value of X for n = 1 through 10)

Mean (M) and Variance (V) are calculated, according to a predetermined formula (f),
at each iteration N,
where n:= n+1

⇒ The variance is less than 0.5 ==> the most common = 5

| $X_i$ | M | V | n |
|---|---|---|---|
| $X_1$ | 7 | 0 | 1 |
| $X_2$ | 6 | 1 | 2 |
| $X_3$ | 5.66 | 0.88 | 3 |
| $X_4$ | 5.75 | 0.69 | 4 |
| $X_5$ | 5.6 | 0.64 | 5 |
| $X_6$ | 5.5 | 0.58 | 6 |
| $X_7$ | 5.57 | 0.53 | 7 |
| $X_8$ | 5.5 | 0.5 | 8 |
| $X_9$ | 5.44 | 0.46 | 9 |
| $X_{10}$ | 5.4 | 0.44 | 10 |

Table 310

EFFICIENT DATA PROFILING TO OPTIMIZE SYSTEM PERFORMANCE

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to performance optimization in a computing environment and, more particularly, to efficient calculation of data profiles to optimize execution performance.

BACKGROUND

Data profiling generally refers to the process of examining the data available in an existing data source (e.g., a database or a file) and collecting statistics and information about that data for various purposes. For example, data profiling may be used to optimize the execution of logic code in a computing environment by trying to understand data challenges early on in a data or calculation intensive project.

If complex calculations are not performed in advance, execution of the logic code may be delayed. Using data profiling, one can determine in advance, for example, the values that may be commonly used by certain variables during execution of logic code. Once such values are determined, then the execution of the logic code may be optimized by using the calculated values instead of having to calculate those values at a later point in time when the execution of the logic code needs to use said values.

In particular, data profiling is important to profile-based compilation and optimization. Many compilers and optimization tools, such as just-in-time (JIT) compilers, require efficient data profile gathering in order to optimize the program code—JIT compilation involves a method where logic code segments are dynamically compiled at execution time from a high-level language to executable code, in contrast to a static compilation method in which the entire program code is compiled into executable code once, and is then executed multiple times.

Most data profiling schemes require instrumenting the program code for data profiling by first performing a test run and allowing the program code to fully or partially run the entire course of execution. During the test run, all the related values for the target variables may be temporarily stored in memory or in a database. After all the values are stored, then an analysis program is run on the stored data to perform a statistical analysis by applying the desired statistical formulas to the data.

The above method, depending on the length of the test run, the number of variables involved, the complexity of the calculations and the amount of data that is stored and analyzed, may require a substantial overhead in terms of execution and storage resources. Further, the length of time that it may take to analyze the data or to calculate the results of the test run may be prohibitively long, in an implementation in which the data analysis or calculation is performed during the execution of the program code.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for data profiling is provided. The method comprises monitoring value of at least a target parameter during execution of logic code in a computing environment, wherein the value of the target parameter is incrementally updated in a sequence of data points; and using statistical analysis to determine a target value for the target parameter as of a current data point, in response to determining a change in the value of the target parameter at each data point, wherein the statistical analysis used to determine the target value at the current data point is repeatedly applied to calculate the target value as the value of the target parameter is incrementally updated during future data points.

In one embodiment, each data point is associated with a point of time in the execution of the logic code. The calculated target value may be used to optimize execution of the logic code for a certain implementation and statistical analysis may be used to determine the most common value for the value assigned to the target parameter during the execution of the logic code at each data point.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, an efficient data profiling technique is provided to determine the value of target variables or parameters used in a program code during execution. The value may be a single number, a pair, the difference between a pair of values, or a tuple, for example. As provided in further detail below, in one embodiment, a constant number of memory slots and low-overhead calculations are used to perform the statistical analysis as a part of the data profiling.

Depending on implementation and the nature of the program code being executed, certain values are stored in registers or are assigned to variables or function parameters which are then analyzed to derive additional values that are used to help optimize performance of certain functions or operations. Examples of optimizations that benefit from data profiling include stride data prefetching and function specialization.

Data prefetching is a technique that attempts to overcome the performance gap between a processor and a memory device, by prefetching data from the main memory into a cache device that has faster data access rates than the memory device. The processor hardware or program code executed on the processor anticipates in advance the data that is to be fetched and requests that data from main memory before it is actually needed.

In stride prefetching, the data is fetched in fixed strides (e.g., a predetermined number of data blocks are fetched) depending on cache size, the stride function or other factors. The prefetched data is placed in the cache until it is actually needed to be processed. In this manner, the data may be fetched from the cache in a shorter amount of time than if it is to be retrieved from the main memory. Data profiling, as provided below, may be utilized to, for example, determine the most common stride value for the stride function to avoid bad or missing prefetching instances.

Function specialization, another example in which data profiling is useful, involves the creation of a specialized function from an otherwise general function employed by a computing component such as the compiler. The specialized function is utilized in certain circumstances when, for example, one or more predetermined conditions are met during the execution of the program code. The specialized function uses a fixed value for a parameter instead of a value that would have otherwise been calculated by the general function under different circumstances.

In the following, a discussion of efficient data profiling methods and systems is provided, first in the form of a general overview and later in more detail by way of example as applicable to specific scenarios or functions. The disclosed data profiling approach, in one embodiment, may be used to determine the most common value for one or more variables or parameters to avoid last minute calculations, thereby optimizing the performance of the system.

Figure 1:
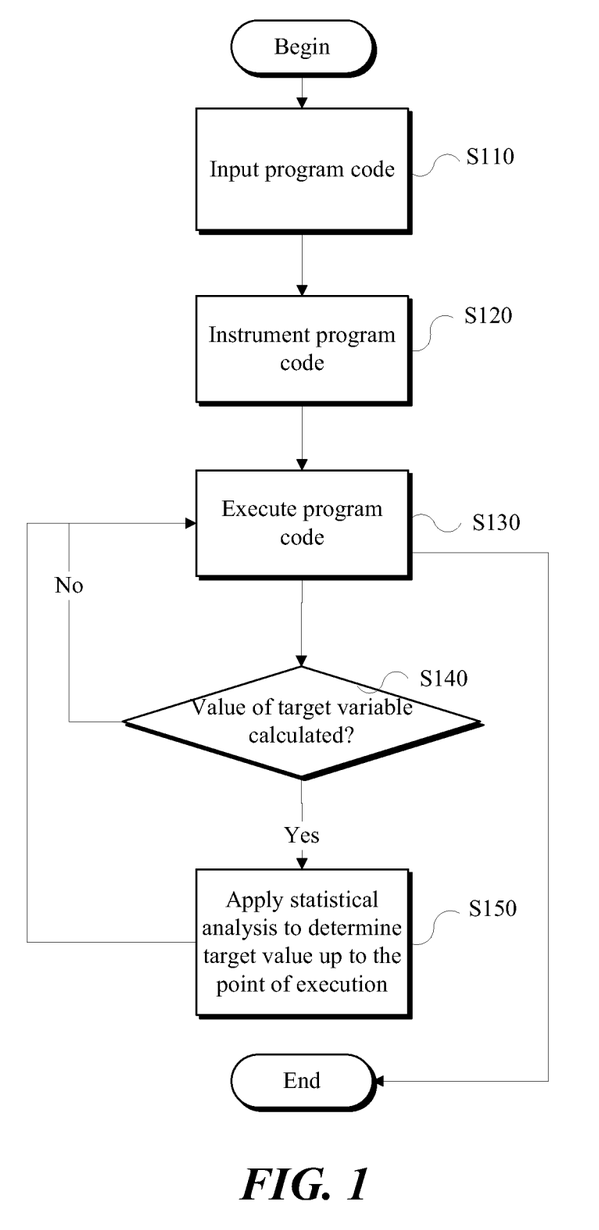
FIG. 1 illustrates flow diagram of an exemplary data profiling method in accordance with one or more embodiments.
Figure 2:
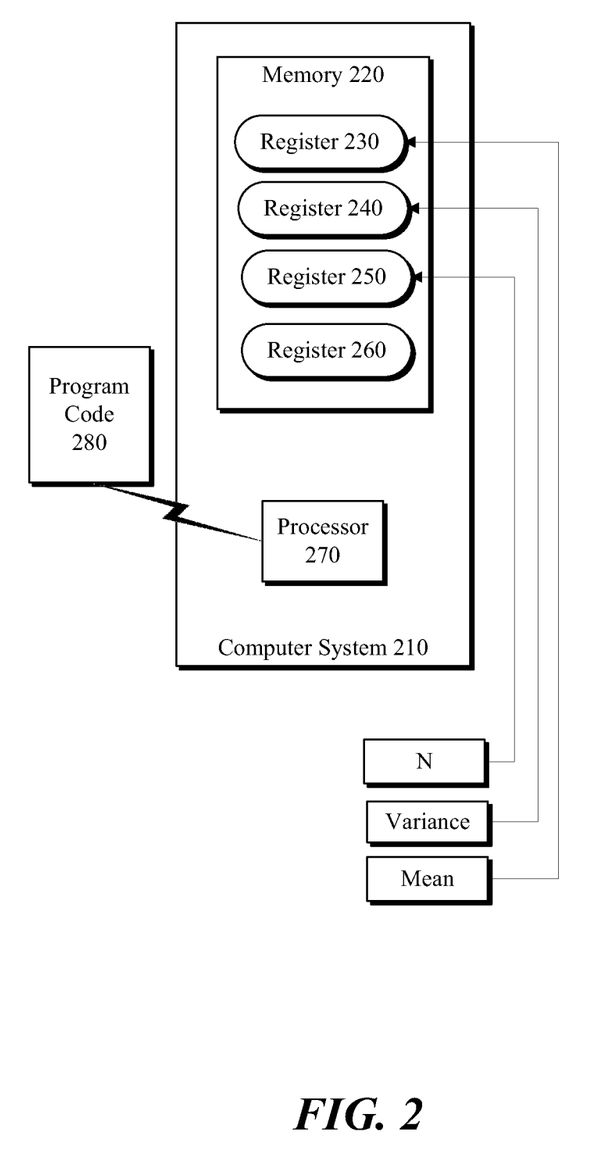
FIG. 2 is an exemplary block diagram of a computer system for performing statistical analysis, in accordance with one embodiment.

Referring to FIGS. 1 and 2, an exemplary process is illustrated for optimizing the performance of program code 280 on a processor 270 included in a computer system 210. As shown, the computer system 210 comprises memory 220 having a plurality of registers. To optimize program code 280, it may be provided as input to computer system 210 (S110). Program code 280 is then instrumented (S120) and executed (S130) on the processor 270.

By way of instrumentation of program code 280, certain parameters or variables may be targeted or monitored so that when the value of the parameter or variable is calculated or updated (S140), due to a function call for example, the new value is analyzed according to a statistical formula. As provided in further detail below, in certain embodiments, statistical analysis is applied to determine the value of a target parameter or variable up to the particular point of execution (S150).

Depending on the nature of the data profiling, the type of function targeted, the context in which the program code 280 is executed, or other details, statistical analysis is performed to determine the value or values that may be used to optimize the performance of program code 280. In the following, a more detailed discussion is provided as applicable to certain exemplary functions. It is noteworthy, however, that in other embodiments same or similar concepts may be implemented or applied to other functions without detracting from the scope of the claimed subject matter.

Figure 3:
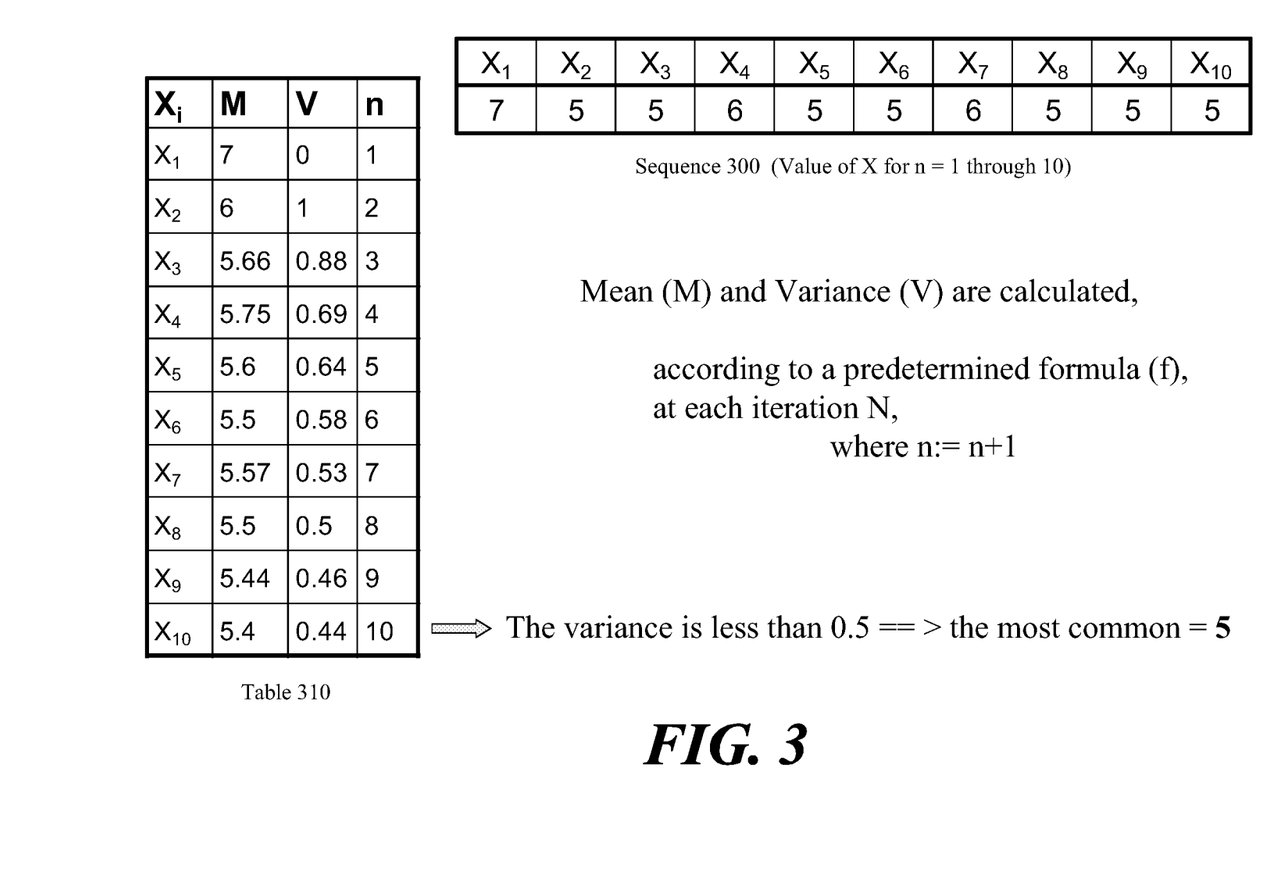
FIG. 3 is a block diagram of an exemplary illustration of the data values stored in a fixed number of memory slots or registers at each execution point in accordance with one embodiment.

Referring to FIGS. 2 and 3, one embodiment is implemented based on the calculation of the most common value in a given sequence of profiled data points. In this context, data points refer to stream of values being used to calculate the most common value. Since the values provided at each of the data points may be generated irregularly, in this example embodiment, the most common value is determined by calculating the mean and variance from the sequence of profiled data points.

In one embodiment, the mean is considered to be a constant or common value, if the variance falls in a small predefined range (i.e., a delta threshold). Each data access or value may be profiled during the instrumentation phase noted earlier. Desirably, the memory consumption and computation time at the execution phase is kept constant for each profiled memory access. That is, the instrumented data profiling scheme may be used to determine the value of a target parameter or variable using a fixed number of counters, operations and memory (e.g., registers).

To achieve an implementation that supports fixed memory size and execution time thresholds, in one embodiment, an incremental computation method is utilized to calculate the mean and the variance of a sequence of profiled data points at each step that data point is reached during execution. In one embodiment, the computation method for determining the most common value is based on calculation of the mean ($\mu_n$) of n data points $x_1 \ldots x_a$ which arrive in a stream (i.e., in a sequence), in accordance with the following formula:

$$\mu_n = \mu_{n-1} + \frac{1}{n}(x_n - \mu_{n-1})$$

where:

$\mu$=the current mean,
$\mu_{n-1}$=the previous mean,
n=the total number of data points and
$x_n$=the new data point.

Referring to the exemplary operations discussed earlier, for function specialization, $x_n$ is, for example, the parameter value. And for data prefetching the parameter is $x_n = \text{mem}_n - \text{mem}_{n-1}$, i.e. the difference between current and previous memory accesses, wherein $\text{mem}_n$ refers to a memory address the parameter value $x_n$ is stored.

In one embodiment, the variance of n data points $x_1 \ldots x_n$ with a mean equal to $\mu_n$ is determined according to the formula provided below, which suggests a method of collecting incremental mean and incremental variance without having to store all the data in a database first and then running a mean and variance calculation on the entire data:

$$S_n = S_{n-1} + (x_n - \mu_{n-1})(x_n - \mu_n)$$

$$\sigma_n = \sqrt{S_n/n}$$

Accordingly, to optimize the performance of the program code in the above exemplary scenarios, the most common value of a target function parameter is incrementally determined at each data point based on the above-noted formulas. Desirably, the system utilizes a fixed and limited amount of memory (e.g., registers) and a relatively small number of calculations are performed at each data point, as provided in further detail below.

Referring to FIG. 3, ten (n=10) exemplary data points ($x_1$ to $x_{10}$) are illustrated, where three memory locations 220 (e.g., on chip registers 230, 240, 250 or three main memory slots—not shown) are used to store the incrementally calculated values for the mean (M), the variance (V) and the sequence number (n) at each data point (see Table 310). A data point may be, for example, an instance during execution of program code in which a function that uses or updates a target parameter is called.

As shown, the value for the target parameter in sequence 300 varies from 5 to 6 to 7 at different data points. The mean at data point n=1 is calculated according to the above formula as 7, with a variance of 0. At data point n=2, the mean is 6, with a variance of 1, and so on until the last data point n=10, in which the mean is 5.4 and the variance is 0.44. In this example, since the variance is less than 0.5, it may be assumed with a high level of certainty that the most common value for the target parameter is 5 in sequence 300.

It is notable that using the above data profiling scheme, the mean and the variance are updated at each data point and are kept current as to the prior values that are considered as of the current data point. As such, the value of the target parameter is incrementally calculated at each data point such that if program execution is suspended or terminate, the latest incrementally calculated value for the target parameter may be utilized for the purpose of optimization. In contrast, other data profiling methods that do not use an incremental analysis approach may have to start the analysis over from the beginning.

Advantageously, in the data profiling implementation disclosed here, the mean and variance values are incrementally update at each data point in real time. This approach limits the use of memory space to a fixed number of memory spaces. For example, as shown in FIG. 3, a minimum of three memory locations are used for storing values associated with means, variance and N which are incrementally updated during each data point.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
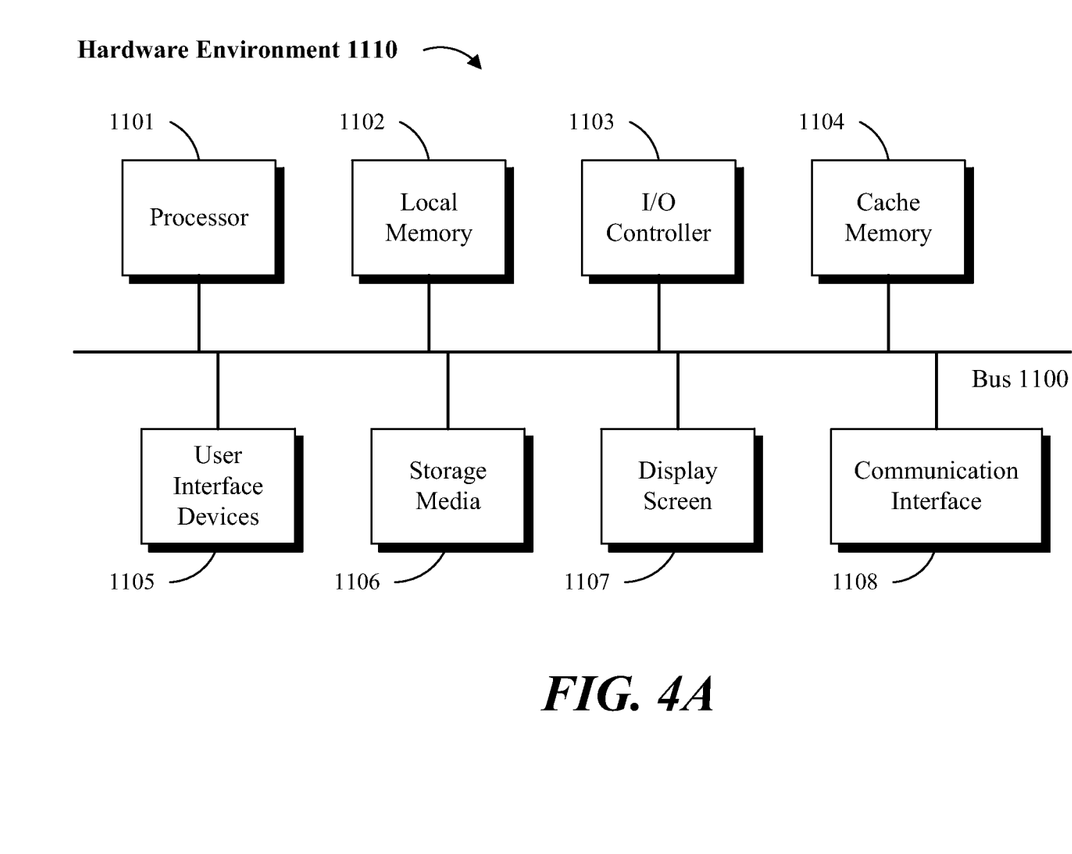
FIGS. 4A and 4B are block diagrams of hardware and software environments in which the disclosed systems and methods may operate, in accordance with one or more embodiments.
Figure 4B:
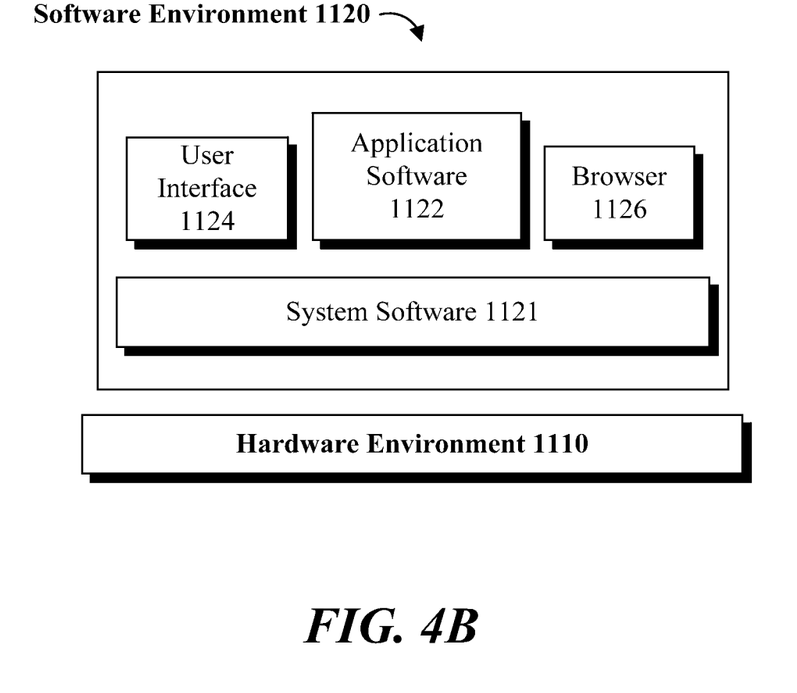

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B; software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an, object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented data profiling method comprising:

instrumenting logic code to include a plurality of data points at which value of a target parameter defined by the logic code is of interest, wherein the value of the target parameter varies during execution of the program code;

monitoring value of the target parameter during execution of the logic code in a computing environment, wherein the value of the target parameter is calculated at each data point in the subset of the plurality of data points based on incrementally updating the target value associated with the target parameter in a sequence of data points traversed during the execution of the logic code; and wherein statistical analysis is used to update, in real time, the target value for the target parameter based on calculated value for the target parameter at a data point being traversed at that time and based on at least one value calculated for the target parameter during a previously traversed data point, wherein the statistical analysis determines a value to be assigned to the target parameter as a most common value of the plurality of data points, the most common value being a most frequent value in the plurality of data points;

wherein the statistical analysis is repeatedly applied during traversal of subsequent data points in the subset of plurality of data points to calculate an updated target value for the target parameter, and wherein the target parameter value is stored.

2. The method of claim 1, wherein the computation method for determining the most common value is based on calculation of the mean ($\mu_n$) of n data points $$\mu_n = \mu_{n-1} + \frac{1}{n}(x_n - \mu_{n-1})$$

$x_1 \ldots x_n$, which are incrementally updated in a sequence, wherein the computation is in accordance with the following formula:

$$\mu_n = \mu_{n-1} + \frac{1}{n}(x_n - \mu_{n-1})$$

where:

$\mu_n$=the current mean, $\mu_{n-1}$=the previous mean, n=the total number of data points and $x_n$=the new data point.

3. The method of claim 2, wherein in a function specialization implementation, the target parameter value is equal to $x_n$.

4. The method of claim 2, wherein in a data prefetching implementation, the target parameter value is equal to the difference between current and previous values obtained by memory accesses, wherein the previous value is a mean based on n−1 data points, and the current value is a mean based on n data points.

5. The method of claim 2, wherein a variance $\sigma_n$ of n data points $x_1 \ldots x_n$ with a mean equal to $\mu_n$ is determined according to the following formula:

$$S_n = S_{n-1} + (x_n - \mu_{n-1})(x_n - \mu_n)$$

$$\sigma_n = \sqrt{S_n/n}.$$

6. The method of claim 5, wherein the incremental mean is calculated without storing the related data at each data point in a database first and then running a mean calculation on the stored data in the database.

7. The method of claim 5, wherein the incremental variance is calculated without storing the related data at each data point in a database first and then running a variance calculation on the stored data in the database.

8. The method of claim 1, wherein each data point is associated with a point of time in the execution of the logic code.

9. The method of claim 1, further comprising using the calculated target value to optimize execution of the logic code for a certain implementation.

10. A data profiling system comprising:
one or more processor in communication with memory for storing data generated by the one or more processors;
a logic code for instrumenting logic code to include a plurality of data points at which value of a target parameter defined by the logic code is of interest, wherein the value of the target parameter varies during execution of the program code;
a logic code for monitoring value of the target parameter during execution of the logic code in a computing environment, wherein the value of the target parameter is calculated at each data point in the subset of the plurality of data points based on incrementally updating the target value associated with the target parameter in a sequence of data points traversed during the execution of the logic code; and
a logic code for using wherein statistical analysis is used to update, in real time, the target value for the target parameter based on calculated value for the target parameter at a data point being traversed at that time and at least one value calculated for the target parameter during a previously traversed data point,
wherein the statistical analysis determines a value to be assigned to the target parameter as a most common value of the plurality of data points, the most common value being a most frequent value in the plurality of data points,
wherein the statistical analysis is repeatedly applied during traversal of subsequent data points in the subset of plurality of data points to calculate an updated target value for the target parameter, and
wherein the target parameter value is stored.

11. The system of claim 10, wherein the computation method for determining the most common value is based on calculation of the mean ($\mu_n$) of n data points $x_1 \ldots x_n$, which are incrementally updated in a sequence, wherein the computation is in accordance with the following formula:

$$\mu_n = \mu_{n-1} + \frac{1}{n}(x_n - \mu_{n-1})$$

where:
$\mu_n$=the current mean,
$\mu_{n-1}$=the previous mean,
n=the total number of data points and
$x_n$=the new data point.

12. The system of claim 11, wherein in a function specialization implementation, the target parameter value is equal to $x_n$.

13. The system of claim 11, wherein in a data prefetching implementation, the target parameter value is equal to the difference between current and previous values obtained by memory accesses.

14. The system of claim 11, wherein a variance of $\sigma_n$ data points $x_1 \ldots x_n$ with a mean equal to $\mu_n$ is determined according to the following formula:

$$S_n = S_{n-1} + (x_n - \mu_{n-1})(x_n - \mu_n)$$

$$\sigma_n = \sqrt{S_n/n}.$$

15. A computer program product comprising a non-transitory data storage medium having a computer readable program, wherein the computer readable program when executed on a computer causes the computer to:
instrument logic code subject to data profiling to include a plurality of data points at which value of a target parameter defined by the logic code is of interest, wherein the value of the target parameter varies during execution of the program code;
monitor value of the target parameter during execution of the logic code in a computing environment, wherein the value of the target parameter is calculated at each data point in the subset of the plurality of data points based on incrementally updating the target value associated with the target parameter in a sequence of data points traversed during the execution of the logic code; and
use wherein statistical analysis is used to update, in real time, the target value for the target parameter based on calculated value for the target parameter at a data point being traversed at that time and at least one value calculated for the target parameter during a previously traversed data point,
wherein the statistical analysis determines a value to be assigned to the target parameter as a most common value of the plurality of data points, the most common value being a most frequent value in the plurality of data points,
wherein the statistical analysis is repeatedly applied during traversal of subsequent data points in the subset of plurality of data points to calculate an updated target value for the target parameter, and
wherein the target parameter value is stored.

16. The method of claim 15, wherein the computation method for determining the most common value is based on calculation of the mean ($\mu_n$) of n data points $x_1 \ldots x_n$, which are incrementally updated in a sequence, wherein the computation is in accordance with the following formula:

$$\mu_n = \mu_{n-1} + \frac{1}{n}(x_n - \mu_{n-1})$$

where:
$\mu_n$=the current mean,
$\mu_{n-1}$=the previous mean,
n=the total number of data points and
$x_n$=the new data point.

17. The method of claim 16, wherein in a function specialization implementation, the target parameter value is equal to $x_n$.

* * * * *